Figure 1:
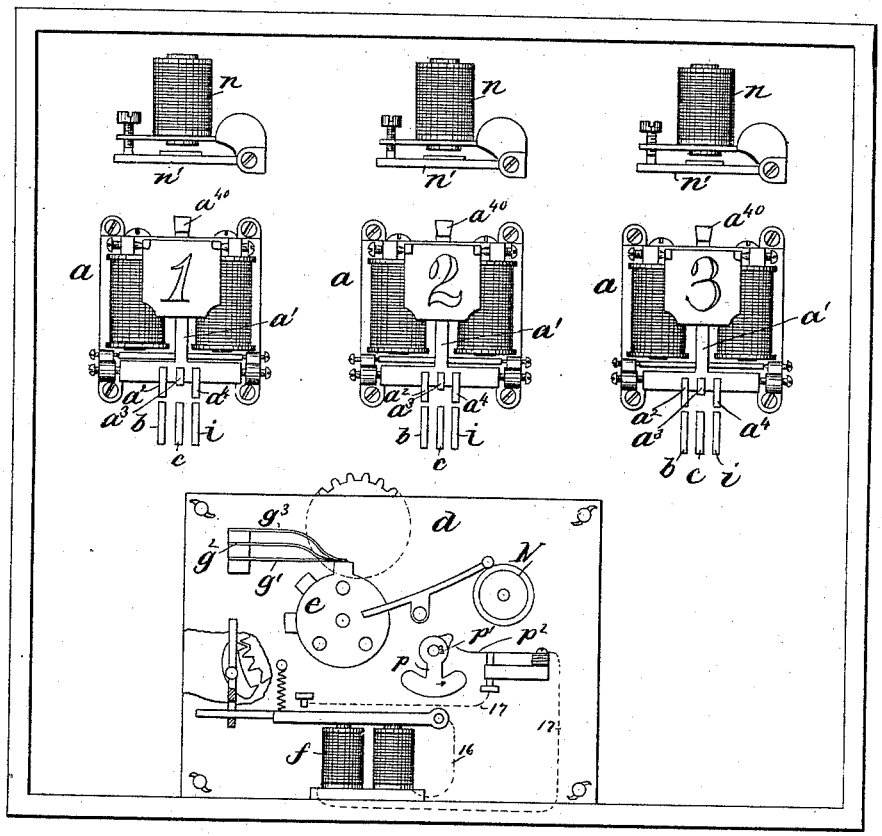

(No Model.) 3 Sheets—Sheet 1.

M. MARTIN.
AUTOMATIC FIRE ALARM.

No. 474,670. Patented May 10, 1892.

Witnesses.
Jas. J. Maloney.
M. E. Hill.

Inventor
Morris Martin
by Jno. P. Livermore
Att'y (No Model.) 3 Sheets—Sheet 2.

M. MARTIN.
AUTOMATIC FIRE ALARM.

No. 474,670. Patented May 10, 1892.

Witnesses,
Jas. J. Maloney.
M. E. Hill.

Inventor,
Morris Martin
by Jos. P. Livermore
Att'y.

(No Model.)  
M. MARTIN.  
AUTOMATIC FIRE ALARM.

No. 474,670. Patented May 10, 1892.

Witnesses  
Jas. J. Maloney.  
M. E. Hill.

Inventor.  
Morris Martin.  
by Jno. P. Livermore  
Att'y.

UNITED STATES PATENT OFFICE.

MORRIS MARTIN, OF MALDEN, MASSACHUSETTS, ASSIGNOR, BY MESNE ASSIGNMENTS, TO JOHN F. NIELSON, OF ELIZABETH, NEW JERSEY.

AUTOMATIC FIRE-ALARM.

SPECIFICATION forming part of Letters Patent No. 474,670, dated May 10, 1892.

Application filed February 21, 1887. Serial No. 228,410. (No model.)

*To all whom it may concern:*

Be it known that I, MORRIS MARTIN, of Malden, county of Middlesex, State of Massachusetts, have invented an Improvement in Automatic Fire-Alarm Telegraphs, of which the following description, in connection with the accompanying drawings, is a specification, like letters and figures on the drawings representing like parts.

My invention relates to an automatic fire-alarm telegraph of that class in which a telegraphic message or alarm is automatically transmitted upon the breaking out of a fire through the action of a thermostatic-circuit controlling instrument, which changes the condition of a circuit controlled by it when the temperature rises above a predetermined limit.

The present invention is embodied in an apparatus operating upon the closed-circuit plan, in which, normally, a current flows over the circuit that controls the operation of the signal or alarm, and in apparatus of this class operating on this plan the thermostatic instruments commonly operate by opening the circuit to cause an alarm to be sounded, and consequently any accidental break in the circuit not produced by a thermostat will also cause the alarm to be sounded.

The object of the present invention is to cause the fire-alarm to be sounded only when one of the thermostatic instruments is operated and to produce another alarm or a signal of different character when the circuit is broken or the current interrupted at any point or by any means other than the thermostat.

The invention consists, mainly, in arranging the thermostat to produce a change in the current different from a total interruption thereof, being shown in this instance as diminishing the strength of the current and in the employment of suitable apparatus to respond to such change in current without being affected or set in operation by a total interruption in the current, so that a fire-alarm will be produced only when the thermostatic instrument is operated, other instruments being employed to respond when a total interruption occurs, so as to call attention to the derangement of the circuit without, however, summoning the fire-extinguishing apparatus.

Figure 2:
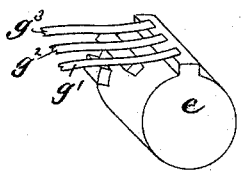
Figure 3:
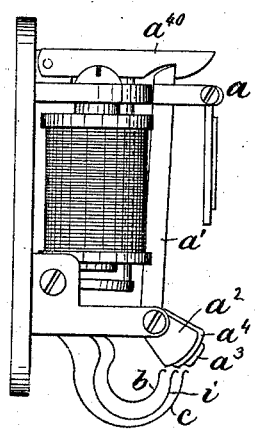
Figure 4:
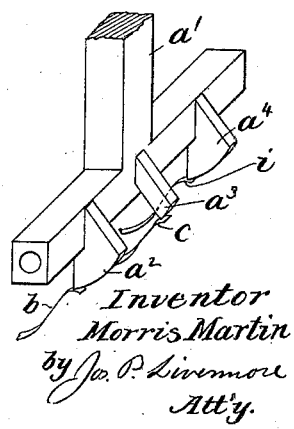
Figure 6:
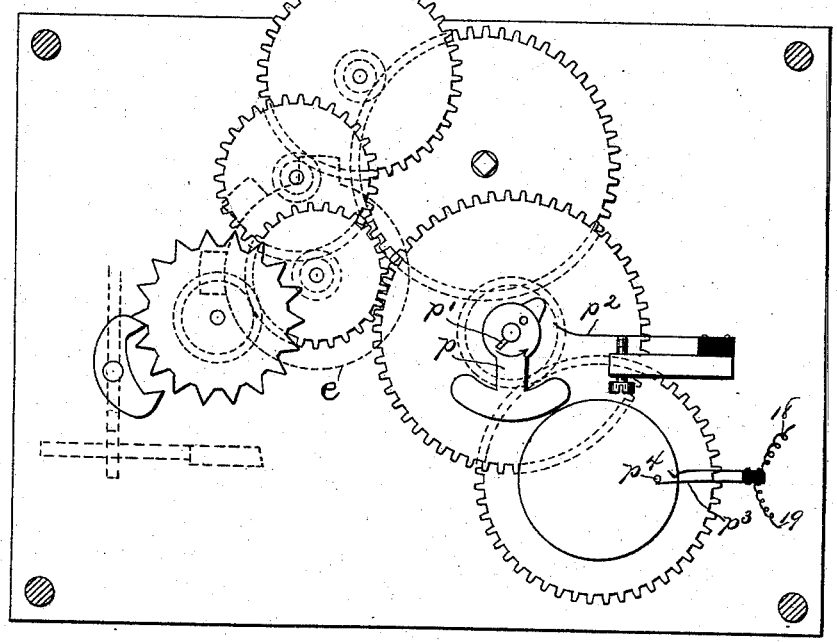
Figure 7:
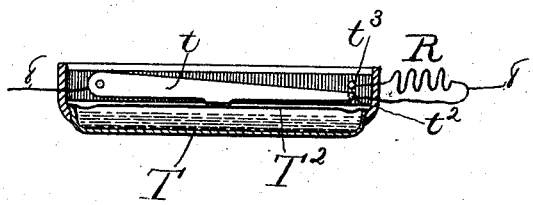

Figure 1 is a front elevation of a portion of the apparatus employed for automatically indicating the breaking out of a fire and its location; Fig. 2, a perspective view of the break-wheel of the transmitter; Fig. 3, a side elevation of one of the annunciator-instruments employed for indicating the locality of the fire; Fig. 4, a perspective view of the portion of the drop-carrying arm of the said annunciator-instrument, showing the circuit-changing devices operated by said arm; and Fig. 5, a diagram representing the circuits, the main circuit or normal path for the current being represented by double lines and the various shunts or branch circuits through which the current passes at different times in the operation of the apparatus being represented by single lines; Fig. 6, an enlarged view of the motor-train of the signal-producing instrument, as seen in front elevation with the front frame-plate removed; and Fig. 7, a detail showing one of the thermostatic instruments in sectional elevation.

The invention is shown as employed in connection with an apparatus the main portion of which is substantially the same as in Letters Patent No. 329,468, granted November 3, 1885, to which reference may be had, and the mode of operation for indicating the existence and locality of a fire is similar to that described in the said patent.

The apparatus comprises a number of visual signals or annunciator-drops $a$, the coils of which are included in the main circuit, but normally shunted by a circuit of low resistance, so that their magnets are normally demagnetized and their armatures unattracted when holding the drop or indicator concealed. The drop proper consists of a flap hinged on an arm $a'$ normally held elevated by a hook $a^{40}$, that is disengaged from the said arm by the movement of the armature of the magnet when attracted, thus permitting the arm $a'$ to fall by gravity. The said arm $a'$ or the shaft on which it is pivoted is provided with three cams $a^2 a^3 a^4$, that co-operate with springs $b$, $c$, and $i$, being so shaped as to touch neither of said springs when the arm $a'$ is held up, as shown in Fig. 3, and so that the cam $a^3$ will touch the spring $c$ during the fall of the arm, which comes to rest with the cams $a^2$ $a^4$ touching the springs $b$ and $i$, but with the cam $a^3$ having passed the spring $c$, so that it only made a momentary contact with the said spring during the fall of the arm. The cams $a^2$ $a^3$ and springs $b$ $c$ constitute a circuit-closer by which the motor $d$, that transmits the fire-alarm signal, usually an audible one, is set in operation, the said motor $d$ causing the rotation of a break-wheel or series of break-wheels $e$ co-operating with a series of contact-springs $g'$ $g^2$ $g^3$, each of which co-operates with the said break-wheel to produce a different signal from the others, and each having its operation controlled by the cam $a^4$ and spring $i$ of one of the drops $a$, as will be described, so that the same operation that causes one of the visual indicators $a$ to be operated causes the corresponding audible signal to be transmitted or produced by the action of the motor $d$. The said motor $d$ and break-wheels operated by it produce a signal, as shown in this instance, on a gong or bell $h$ in a local circuit controlled by a relay $h'$, causing a blow to be struck on the said gong each time that a tooth of the break-wheel $e$ co-operates with that one of the springs $g'$ $g^2$ $g^3$ that happens to be in circuit.

Corresponding to each of the indicating-instruments $a$ is an electro-magnetic switch $n$, the coil of which is in the shunt for the corresponding instrument $a$. The armatures $n'$ of the said switches $n$ are so adjusted that they will be retained attracted when the current through the magnet is considerably diminished, but will be retracted when the current is wholly interrupted by the breaking of the circuit or otherwise, and when retracted preferably will move so far from the pole of the magnet as not to be again moved up to the pole when the magnet is affected by a current of normal strength. The armature of each of the switches $n$ controls a circuit from the spring $g'$, $g^2$, or $g^3$ corresponding to the same indicating-instrument, rendering the said circuit inoperative for the transmission of a fire-alarm when the said armature is retracted.

The operation of the various devices thus far described will be best understood by reference to the diagrams Fig. 2. The coils of the instruments $a$ are in the circuit 2, leading from one pole of the battery B, the said circuit being continued beyond the said instruments $a$ by wire 3 to one terminal of the relay $h'$, that controls the alarm-signal $h$, the other terminal of said relay being connected by wire 4 with one terminal of the detent-magnet $f$, that controls the operation of the motor $d$, the other terminal of which magnet is connected by wire 5 with the other pole of the battery B, thus completing the main circuit. The circuit is normally diverted from each of the instruments $a$ by a shunt 8 of low resistance that includes the coils of the switch-magnets $n$, and also includes one or more thermostatic instruments T, each containing a switch-arm $t$, that normally affords a direct circuit, but which when moved by the action of the thermostat when the temperature is raised above the predetermined limit opens the direct circuit, but previously closes a branch containing resistance R, which is of such amount as to cause sufficient current to pass through the coils of the corresponding instrument $a$ to cause the latter to release the drop-arm $a'$, as before described. A sufficient amount of current, however, still passes through the shunt 8 when the resistance R is included therein to retain the magnet $n$ energized and its armature held up in its normal condition. The detent-magnet $f$ of the motor $d$ is normally in circuit and energized, and when in this condition retains the motor inoperative. The said magnet $f$ has a normally-open shunt 14 15, the branch 14 of which is connected with the springs $c$, controlled by the cams $a^3$ on the drop-arms, and the branch 15 is connected with the springs $b$, controlled by the cams $a^2$ on the drop-arms, and as all three of the cams $a^2$ $a^3$ $a^4$ on the drop-arms are in electrical connection with one another, the said arm will, in dropping, momentarily connect the springs $b$ and $c$, and thus close for an instant the shunt 14 15 of the magnet $f$, which will be demagnetized, its armature retracted, and the motor $d$ thus released and brake-wheel $e$ caused to rotate. The shunt 14 15 is only momentarily connected by the fall of the drop-arm; but the armature of the magnet $f$, that is momentarily retracted, closes another shunt 16 17 around its own coils, so that it remains shunted, and the motor continues to run until the shunt 16 17 is opened.

The spring $i$ of each of the indicating-instruments is connected by wire 9 with the armature of the corresponding magnet $n$, which when attracted makes contact with a stop connected by wires 10, 11, and 12 in the three instruments shown with the springs $g'$ $g^2$ $g^3$, respectively, corresponding to the three indicating-instruments $a$. The break-wheel $e$ is connected by wire 13 with the wire 3 at one side of the relay $h'$, controlling the alarm-instrument $h$.

Figure 5:
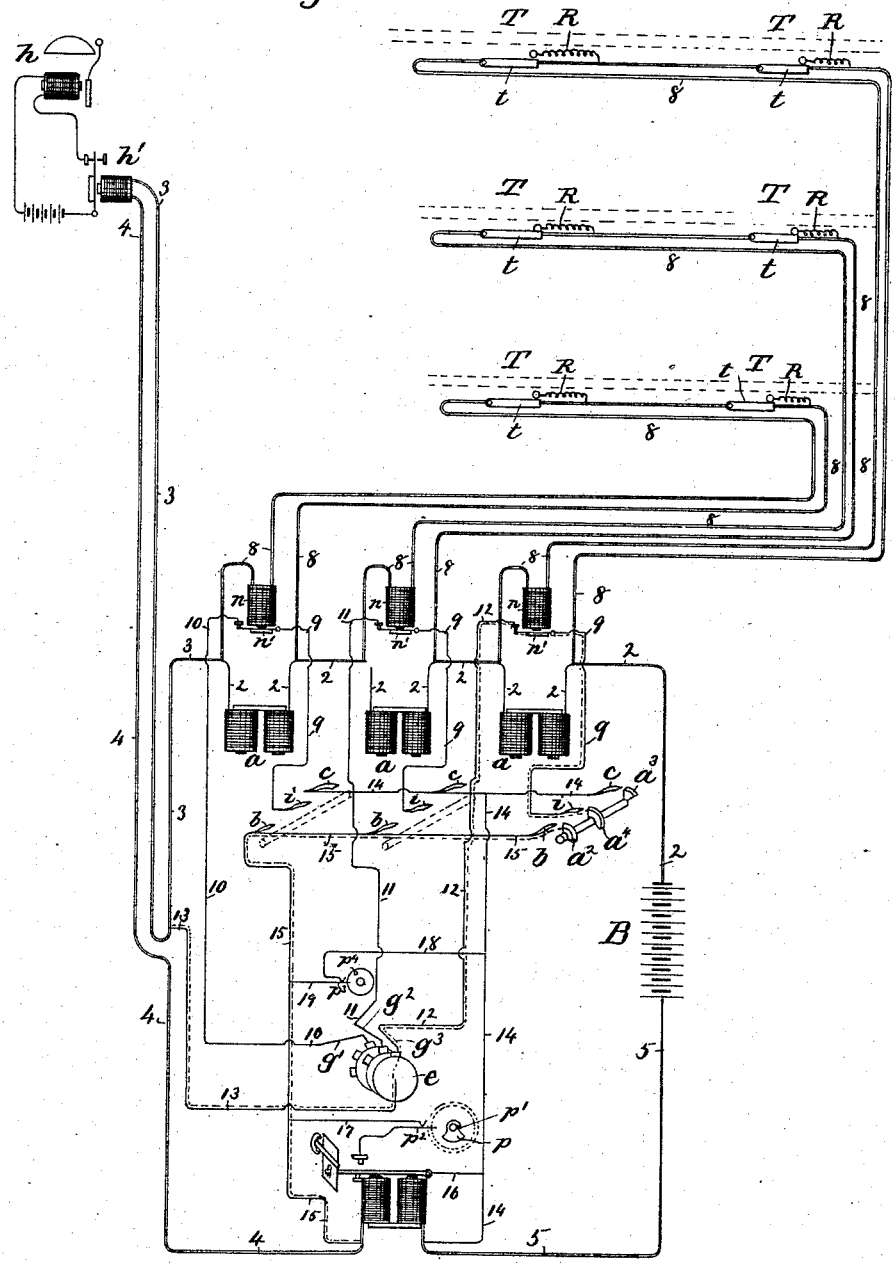

It is to be understood that there are as many of the instruments $a$ and corresponding switches $n$ as there are different localities—such, for instance, as rooms or floors of a building, as indicated in dotted lines, Fig. 5, or different buildings of a group of buildings—from which a fire is to be indicated, and that the shunt 8 for each of the said indicating-instruments extends out through the corresponding locality and is provided with as many of the thermostatic instruments T as may be required, each of which controls the shunt, as before described, that is normally maintaining it of low resistance, so that the magnet of the indicator $a$ will be normally demagnetized and acting, when its temperature is raised by fire, to throw resistance into the said shunt sufficient to cause the indicator-magnet to be energized but insufficient to cause the armature of the switch $n$ to be released. Then when one of the said thermostatic instruments is operated the drop-arm of the corresponding indicating-instrument will be released, and in its fall will close the shunt of the detent-magnet $f$ and set the motor in operation, as before described, and the said arm, after having fallen, will retain the springs $b$ and $i$ electrically connected, thus connecting the wire 15 with the wire 9, and if the armature of the magnet $n$ is in its normal position with the wire 10 and spring $g'$ if the indicator No. 1 is operated or the wire 11 and springs $g^2$ if the indicator No. 2 is operated, and so on, then the action of the motor $d$ and break-wheel $e$ will be as follows: Each time that the break-wheel makes contact with a spring corresponding to the indicator that has been operated—for example, the one $g^3$—it closes a circuit of low resistance around the relay-magnet $h'$, which may be traced as follows: from battery B by wires 5 15 9 12, spring $g^3$, wheel $e$, wires 13, 3, and 2, or such of the shunts 8 as may be closed back to the battery B, thus causing the relay-magnet $h'$ to be demagnetized. As soon as the wheel $e$ in its rotation breaks connection with the spring $g'$ this short circuit around the magnet $h'$ is broken and the current follows the main circuit 2 3 4 5 through the said magnet, causing the same to be energized, so that each tooth and notch of the break-wheel $e$ that passes the spring $g^3$ will cause a to-and-fro movement of the armature of the relay $h'$, which will open and close the local circuit controlled by it and cause the gong to strike a blow in the usual manner.

If instead of having a thermostat operate in the shunt 8 the said shunt had been accidentally broken, the corresponding drop of the indicating-instrument would be operated as previously described; but the armature of the switch-magnet $n$ would also drop, so that the short circuit for the relay $h'$, which includes the wires 9 and 12, controlled by the said armature, would not be closed by the break-wheel, which would consequently produce no effect on the relay $h'$ and instrument $h$ controlled thereby. This derangement of the circuit would consequently not cause an alarm to be given by the instrument $h$, but would make itself known through the operation of the motor $d$, which might operate a local audible alarm N, as described in the patent hereinbefore referred to, while the falling of the drop would show in which shunt-circuit the break had occurred.

If the main circuit outside the shunts 8 should break, the relay $h'$ would be demagnetized and thus cause a single blow on the gong $h$, and the magnet $f$ would be demagnetized, so that the motor would be released and remain in operation until run down or otherwise stopped.

In order to stop the motor after a sufficient period of operation to cause a full signal to be transmitted to the instrument $h$ and repeated any desired number of times, it is necessary to open the shunt 16 17 of the magnet $f$, which may be done by a weight $p$, hung loosely on one of the rotating arbors of the motor and adapted to be engaged by a pin $p'$, carried by the said arbor, so that the weight will be revolved until it gets vertically above the arbor, when it will drop by gravitation, and in so doing will act on a circuit-breaker $p^2$ in the shunt 16 17, opening the same, and thus permitting the magnet $f$ to attract its armature, which will thus retain the said shunt open, although the weight passes the circuit-breaker $p^2$ and permits it to close again ready for the next operation.

If it is desired to retain the motor in operation during more than one revolution of the arbor carrying the weight $p$, a second shunt 18 19 may be provided for the magnet $f$, containing a circuit-breaker $p^3$, controlled by a projection $p^4$ on a more slowly moving arbor of the motor, so that the magnet will remain shunted during the openings of the circuit-breaker $p^2$ that occur in the revolution of the projection $p^4$, at the end of which the latter will open the circuit-breaker $p^3$ and the shunt 18 19 and retain it open until after the circuit-breaker $p^2$ has been opened by the weight $p$, which will cause the current to pass through the magnet $f$ and thus stop the motor with the shunt 18 19 open at $p^3$ and the shunt 16 17 open at the armature of the magnet $f$, but with the circuit-breaker $p^2$ closed, so that the shunt may be closed the next time the armature of the magnet $f$ is released, as before described.

Any suitable thermostatic instrument may be employed to introduce the resistance into the circuit or change the condition of the current without absolutely interrupting the current through the said instrument. A thermostatic instrument capable of operating properly in this apparatus is shown in Patent No. 329,470, granted to me November 3, 1885, to which reference may be had, the essential parts of said instrument being herein shown in section in Fig. 7, the same comprising a reservoir T' in the shape of a flat disk having one wall stiff and its other wall $T^2$ somewhat flexible. The said disk reservoir contains a liquid which volatilizes at a low temperature, so that upon a slight increase of temperature above the normal the vapor of the said liquid expands or bulges out the flexible wall $T^2$ of the reservoir, which is adjacent to a switch-arm $t$, co-operating with contacts $t^2$ B $t^3$. Said arm normally rests on the contact-piece $t^2$, and in its movement, produced by the bulging of the reservoir, it will make electrical connection with the contact $t^3$, and subsequently break connection with the contact $t^2$, so that the resistance R, which is included between the contact $t^3$ and the circuit-wire, is thrown into the circuit. The invention is not, however, limited to the employment of a thermostatic instrument of this specific construction for controlling the circuit, nor, in fact, to the employment of instruments automatically operated by a rise in temperature, as it is obvious that the circuit-controlling device herein represented by the thermostat T or the movable switch-lever $t$ thereof might be of any other suitable construction, the said lever $t$ being, for example, operated by hand, the essential feature of this part of the invention being that the said circuit-controlling instrument produces a change in the current without wholly interrupting it, and thus produces a different effect from an accidental rupture of the circuit.

It is not essential that the circuit-changing device herein represented by the arm $a'$ and co-operating parts should also form a part of a visual indicator, as such indicators are not essential to the invention, but are shown, as they form a part of the most perfect apparatus known to me in which to embody the invention, which is not, however, limited to the specific construction shown of the transmitter and other devices, but which has as its main or leading feature the combination or arrangement of signaling-instruments governed by a circuit-controlling device that produces a change in the current in a normally-closed circuit to control a signaling-instrument that is made operative by such change in current, but produces no signal when a break in the circuit occurs.

I claim—

1. The combination of an electric circuit and circuit-changing instrument therein having a movable member or contact-piece which changes the circuit or path of the current without opening the said circuit and interrupting the current through said instrument, with a signal-producing instrument having a detent or starter controlled by said circuit and caused to operate by the change produced by said circuit-changing instrument, and comprising a break-wheel or signaling-surface connected with said circuit and a signaling-instrument operated by the said break-wheel when the said circuit is unbroken, substantially as described.

2. The combination of a visual indicating-instrument and circuit-controlling device governing said instrument normally operating to produce a change in the current which will cause the said indicating-instrument to operate, and an electro-magnetic switch in circuit with said controlling device adjusted to be unaffected by the change in current produced by the said device, with a signal-transmitting instrument the operation of which is governed by the said indicating-instrument, and a circuit by which said transmitting-instrument operates, which circuit is controlled both by the indicating-instrument and switch before mentioned, as described, the said transmitting-instrument being operative only when the indicating-instrument is operated without change in the switch, substantially as described.

3. The combination of a normally-closed circuit and a circuit-controlling instrument therein which when operated makes a change in the current without interrupting it, and an electro-magnetic switch in the said circuit operated only by an interruption of the current, and a signal-transmitting instrument the operation of which is governed by the said circuit-controlling instrument, the circuit for said transmitting-instrument governed by said switch being rendered inoperative when the switch is changed by an interruption in the current, substantially as described.

4. A motor and electro-magnet controlling the operation thereof, and normally-closed electric circuit, including the said controlling electro-magnet, and a shunt for said magnet, closed by the armature thereof when retracted, and a circuit-breaker in said shunt operated by the said motor, substantially as described.

5. A motor and controlling electro-magnet therefor, and normally-closed electric circuit, including said magnet, and two normally-open shunts for said magnet, one of which is closed by the armature of said magnet when retracted and contains a circuit-breaker which is momentarily opened by the movement of the motor, the other shunt containing a circuit-breaker which is opened by the said motor and retained open when the motor ceases to operate, substantially as and for the purpose described.

6. A motor and electro-magnet controlling the operation thereof, and normally-closed electric circuit, including the said controlling electro-magnet, and a shunt for said magnet, closed by the armature thereof when retracted, and a circuit-breaker in said shunt and weight operated by the motor, which in falling momentarily opens the said shunt, substantially as described.

In testimony whereof I have signed my name to this specification in the presence of two subscribing witnesses.

MORRIS MARTIN.

Witnesses:
JOS. P. LIVERMORE,
JAS. J. MALONEY.